Aug. 15, 1950  W. H. KEENER  2,518,990
FLUID ACTUATED HOSE REEL
Filed April 6, 1948  2 Sheets-Sheet 1
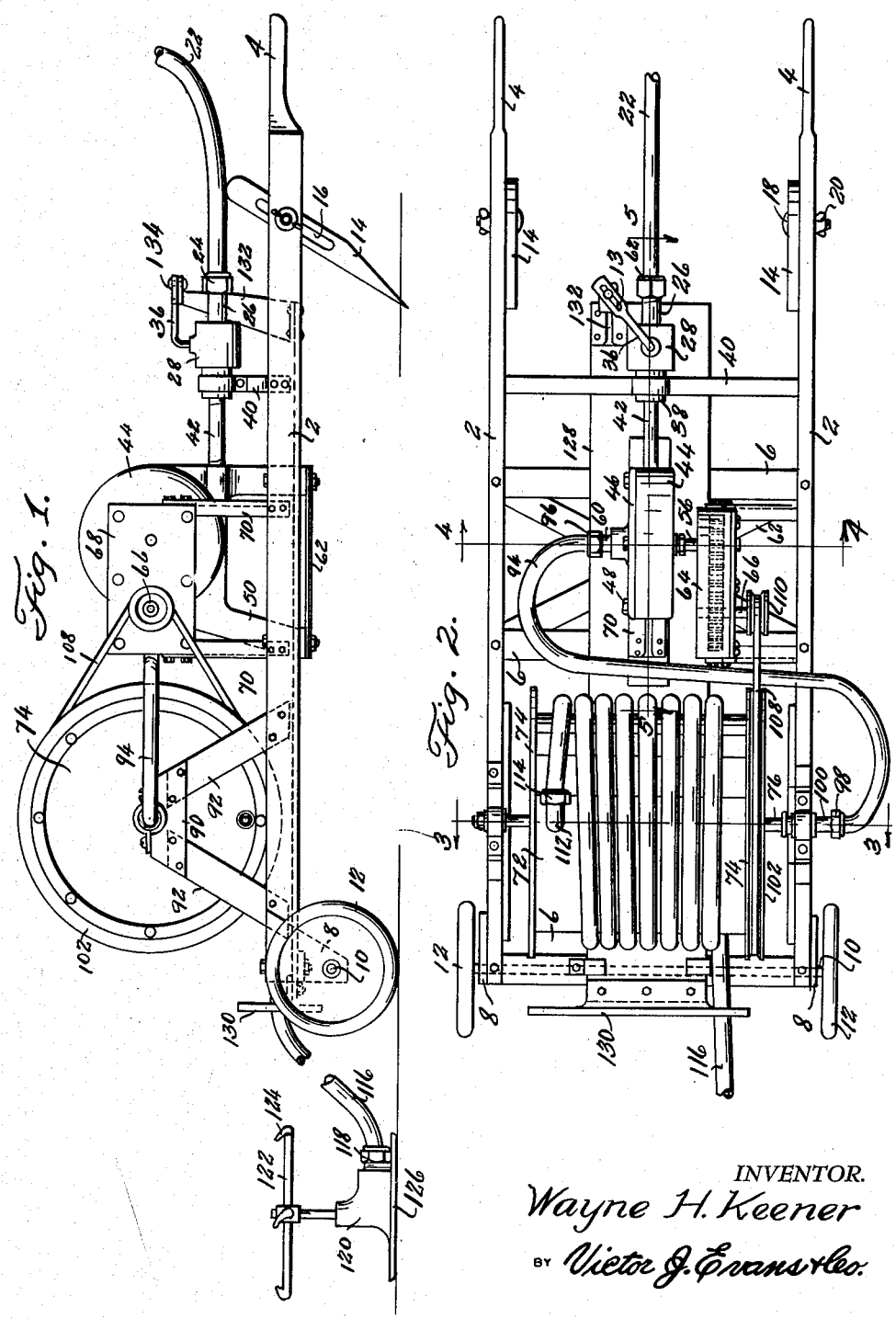
INVENTOR.
Wayne H. Keener
BY Victor J. Evans & Co.
ATTORNEYS Aug. 15, 1950 W. H. KEENER 2,518,990
FLUID ACTUATED HOSE REEL
Filed April 6, 1948 2 Sheets-Sheet 2
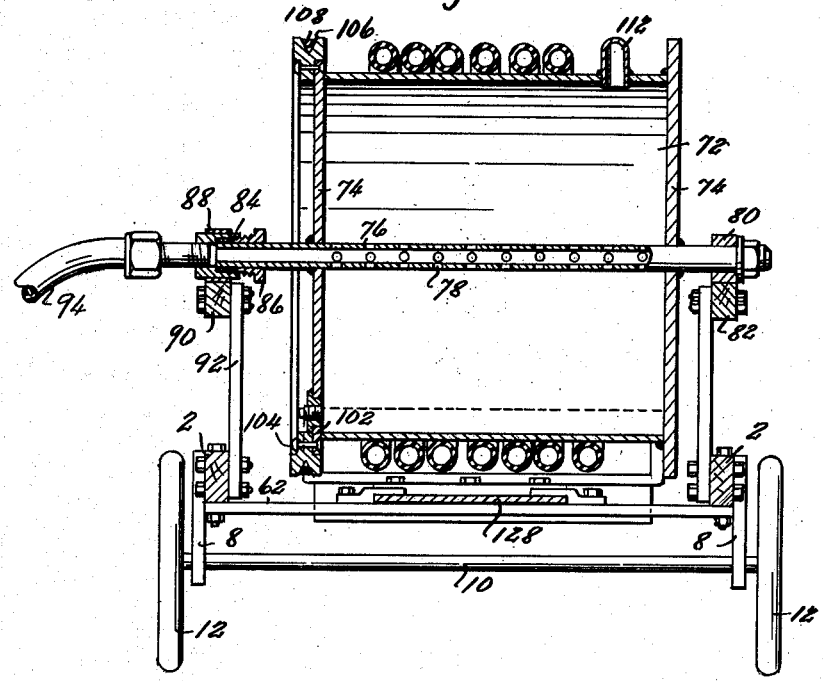
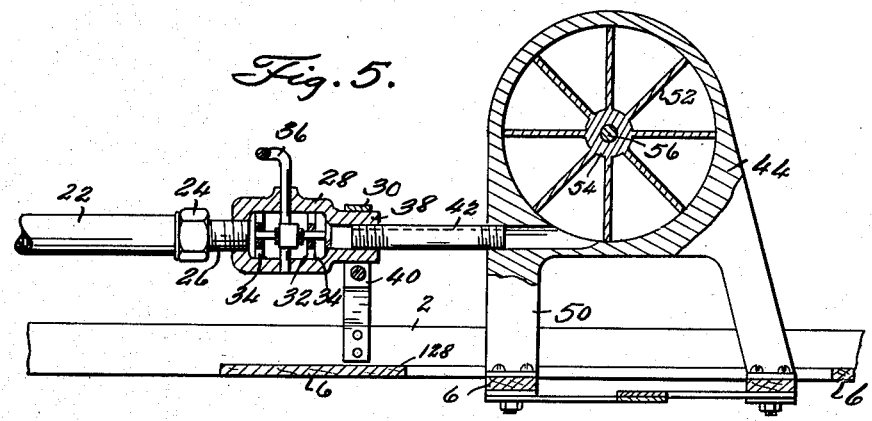
INVENTOR.
Wayne H. Keener
BY Victor J. Evans & Co.
ATTORNEYS

UNITED STATES PATENT OFFICE 2,518,990

FLUID ACTUATED HOSE REEL

Wayne H. Keener, Midland, Tex.

Application April 6, 1948, Serial No. 19,321

2 Claims. (Cl. 299—78)

My present invention relates to an improved fluid actuated hose reel of the type comprising a carriage adapted to be fixedly located on the lawn and carrying a fluid impelled gear train operably connected to a reel upon which is wound the hose to the sprinkler head, the parts being so arranged that, as the water is discharged from the head, the reel will be slowly revolved by the fluid impelled gear train to wind in the head, moving the head over a wide area of surface.

I also provide shut-off means actuated by the retracted head so that the device may be set and started in its extended position and it will automatically retract and shut off the water.

The advantages of this device will be obvious but among the principal is the saving in time and effort in manually moving the conventional sprinkler from place to place on the lawn to cover the desired area.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Figure 1 is a side elevational view of the sprinkler of my invention.

Figure 2 is a top plan view thereof.

Figures 3, 4 and 5 are transverse sectional views at the indicated lines of Fig. 2.

Referring now to the drawings wherein I have illustrated the present preferred embodiment of my invention I employ a pair of side frames 2 terminating rearwardly in handles 4 and secured by transverse headers 6. Forwardly of the frames I use a pair of plates 8 in which is journaled the axle 10 for wheels 12. Anchors 14 are slotted at 16 for co-action with bolts 18 and wing nuts 20 to secure the frame in position on the ground.

A hose 22 is connected to a spigot or faucet not shown, and by coupling 24 is connected to nipple 26 of valve casing 28. The valve 30 is integral with rod 32 slidable in partitions 34 open to permit the flow of water therethrough and the rod is reciprocable by exterior lever 36. The outlet nipple 38 is supported by bracket 40 and the pipe 42 communicates with housing 44 secured to side plate 46 by screws 48. The housing is supported by bifurcated web 50 carried by headers 6.

An impeller 52 has a hub 54 secured to shaft 56 and within the housing 44 and the blades of the impeller are cut out at 58 to permit the flow of water out of the casing through nipple 60.

The shaft 56 carries a gear 62 meshing with gear 64 on shaft 66 and the gears are enclosed in a casing or housing 68, supported by arms 70 on frames 2.

Forward of the impeller and gear housings I locate the hose reel 72 having ends 74 comprising a closed hollow drum mounted on, and rotatable with the tubular shaft 76 having orifices 78 within the drum. One end of this shaft is journaled in bearing 80 supported at 82 on the frame and the other end has a packing gland 84 confined by packing nut 86 in bearing 88 journaled at 90 on support 92.

A conduit or hose 94 is connected by coupling 96 to the impeller nipple 60, and by coupling 98 to the nipple 100 in the packed bearing.

The drum is fashioned with a ring 102 secured by screws 104 and a peripheral notch 106 for V-belt 108 driven from and by pulley 110 on shaft 66 of the gear train.

An outlet nipple 112 for the drum receives the coupling 114 of hose 116 which is connected by coupling 118 to sprinkler 120 having discharge tubes 122 and nozzles 124 of the conventional rotatable type. A smooth flat base 126 supports the sprinkler in slidable relation on the ground surface.

Extending longitudinally of the frame and slidable thereon I use a bar 128 having abutment faces 130 in the path of the retracted head and rearwardly provided with a vertical arm 132 having a pin 134 engaged in slot 136 of the lever 36.

In use with the bar retracted to shut off the flow of water, the hose 116 is rearward and the sprinkler suitably located. The bar may then be extended opening valve 30. The water will then actuate the impeller and passing through the above described channels will exhaust through the sprinkler nozzles.

The impeller will operate the gear train and through the pulley and belt will slowly revolve the drum winding in hose 116 until the sprinkler strikes the faces 130 to actuate the lever 36 and cut off the water supply.

From the above description it will be apparent that when the hose is extended and the water supply valve is opened, the device requires no further attention and will automatically wind the hose and shut off the water.

Having thus fully described my invention what I claim as new and desire to secure by Letters Patent is:

1. In a lawn sprinkler, a housing having a connection for a source of fluid under pressure, an impeller rotatably arranged in said housing to be driven by said fluid, a first shaft connected to said impeller and projecting out of said housing, a casing spaced from said housing, a second shaft, means in said casing operatively connecting said first shaft to said second shaft, a hollow hose reel arranged in spaced relation with respect to said housing and casing, a tubular shaft for supporting said reel, there being a plurality of orifices in said tubular shaft for the egress therethrough of fluid, means operatively connecting said second shaft to said reel for rotating the latter, a conduit connecting said housing to said tubular shaft for conveying fluid to the latter, and a hose connected to said reel for the egress therethrough of fluid.

2. In a lawn sprinkler, a housing having a connection for a source of fluid under pressure, an impeller rotatably arranged in said housing to be driven by said fluid, a first shaft connected to said impeller and projecting out of said housing, a casing spaced from said housing, a first gear arranged in said casing and connected to said first shaft, a second gear positioned in said casing and arranged in meshing engagement with said first gear, a second shaft connected to said second gear, a hollow hose reel arranged in spaced relation with respect to said housing and casing, a tubular shaft for supporting said reel, there being a plurality of orifices in said tubular shaft for the egress therethrough of fluid, belt and pulley means operatively connecting said second shaft to said reel for rotating the latter, a conduit connecting said housing to said tubular shaft for conveying fluid to the latter, and a hose connected to said reel for the egress therethrough of fluid.

WAYNE H. KEENER.

REFERENCES CITED

The following references are of record in the file of this patent:

UNITED STATES PATENTS

| Number | Name | Date |
|---|---|---|
| 1,714,713 | Farley | May 28, 1929 |
| 1,761,191 | Browning | June 3, 1930 |